(12) United States Patent
Pfeiffer

(10) Patent No.: US 7,010,449 B2
(45) Date of Patent: Mar. 7, 2006

(54) METHOD FOR REPLACING DIGITAL LOAD CELLS

(75) Inventor: Gebhard Pfeiffer, Muehlheim (DE)

(73) Assignee: Bizerba GmbH & Co. KG, Balingen (DE)

( * ) Notice: Subject to any disclaimer, the term of this patent is extended or adjusted under 35 U.S.C. 154(b) by 0 days.

(21) Appl. No.: 11/010,879

(22) Filed: Dec. 13, 2004

(65) Prior Publication Data

US 2005/0150695 A1    Jul. 14, 2005

Related U.S. Application Data

(63) Continuation of application No. PCT/EP03/06143, filed on Jun. 12, 2003.

(30) Foreign Application Priority Data

Jun. 13, 2002  (DE) ................................ 102 27 121

(51) Int. Cl.
G01G 23/01  (2006.01)

(52) U.S. Cl. ........................ 702/101; 177/50; 73/1.13
(58) Field of Classification Search ................ 73/1.13; 702/101, 102; 177/50, 185
See application file for complete search history.

(56) References Cited

U.S. PATENT DOCUMENTS

| 4,804,052 A | * | 2/1989 | Griffen ..................... 177/25.14 |
| 4,815,547 A | * | 3/1989 | Dillon et al. ............ 177/25.14 |
| 4,909,338 A | * | 3/1990 | Vitunic et al. ................ 177/50 |
| 5,623,128 A | * | 4/1997 | Grimm et al. ........... 177/25.13 |
| 5,780,782 A | * | 7/1998 | O'Dea ........................ 177/136 |
| 6,636,820 B1 | * | 10/2003 | Livingston .................. 702/101 |
| 2003/0158684 A1 | * | 8/2003 | Livingston | |
| 2004/0050593 A1 | | 3/2004 | Baeumel et al. | |

FOREIGN PATENT DOCUMENTS

| DE | 100 41 251 A1 | 3/2002 |
| EP | 0 319 101 A1 | 6/1989 |
| EP | 0 319 202 A2 | 6/1989 |

* cited by examiner

*Primary Examiner*—Randy W. Gibson
(74) *Attorney, Agent, or Firm*—Leydig, Voit & Mayer, Ltd

(57) ABSTRACT

To provide a method with which one or more digital load cells of a load-receiving device can be replaced without the weighing system having to be newly calibrated, it is proposed that, in the event of a replacement, at least one of the previous load cells remains in the weighing system and in that, once the replacement has taken place, a new set of parameters is determined for the load cell used as the replacement via the central control unit on the basis of the data of the replaced load cell, which the control unit receives from the load cell remaining in the system, and is stored in the parameter memories of all the load cells.

10 Claims, No Drawings

METHOD FOR REPLACING DIGITAL LOAD CELLS

The present disclosure is a continuation of international application No. PCT/EP03/06143 of Jun. 12, 2003, which is incorporated herein by reference in its entirety and for all purposes.

BACKGROUND OF THE INVENTION

The invention relates to a method for replacing digital load cells in a weighing system.

A weighing system often comprises a load-receiving device, which serves for supporting objects intended for weighing. Such a load-receiving device has a number of associated load cells. There are generally 4 load cells, since a load cell is fitted in each corner of the usually rectangular load-receiving device. If these cells are digital load cells, they are normalized, linearized and temperature-compensated even before installation, that is during production, in an automatic process. After undergoing this process, the digital load cells provide a counter reading from 0 to 240000 n digits, for example, over the intended weighing range. If installed in a weighing system with a load-receiving device, the digital load cells are connected to one another via a measuring bus. The measuring bus is also connected to a control unit, for example a terminal, which controls and monitors the digital load cells or the weighing system.

The terminal may comprise evaluation electronics or a data-processing device (PC). When it is first used, the weighing system must then first be connected to the terminal and calibrated. For this purpose, a so-called basic adjustment is carried out to establish the nominal load of the weighing apparatus for the load-receiving device. In this adjustment, a "gross counter reading" (sum of the counter readings of the individual digital load cells) is determined and normalized to a counter reading of, for example, 120000 n digits for the weighing apparatus. During the adjustment, in the sequence in which the corners are subjected to loading the digital load cell is assigned to the respective corner on the basis of the bus address, to permit unique identification of the digital load cell in the later possible event of a replacement being necessary.

After the replacement of a defective digital load cell, it has until now been necessary for the complete basic adjustment, that is calibration, to be carried out once again.

DE 100 41 251 A1 discloses a calibratable weighing system with a data-processing device in which at least one digital load cell serves for storing the load cell parameters and additional system parameters. In each weighing process, these parameters are coded and sent with the weight data to the data-processing device, where they are compared with the parameters likewise stored. If a discrepancy is established in this comparison process, the weighing process is discontinued or at least an error message is displayed. In this case, the data-processing device can be replaced without the weighing system having to be newly calibrated. It is also possible to replace a complete load-receiving device with all the load cells on the data-processing device without the weighing system having to be newly calibrated, since the load-receiving device can in principle be calibrated as a unit and all the parameters of the calibration are stored in the memories of the digital load cell. The parameters can then be read back by the data-processing device after the replacement of the load-receiving device. However, this document does not contain any proposal allowing only individual cells of the digital load cells of the load-receiving device to be replaced.

However, in the case of large weighing systems and/or weighing systems that are installed in the ground with load-receiving devices, it is not always possible to replace the load-receiving device in its entirety. Replacing one or more digital load cells of a load-receiving device has until now always meant that a new calibration process has to be performed.

A similar situation applies to weighing systems which substantially comprise a load cell system and manage without an actual load-receiving device, for example weighing systems for silos in which a load cell is fitted in each supporting leg of the silo.

SUMMARY OF THE INVENTION

The invention is based on the object of proposing a method by which one or more digital load cells of a load-receiving device can be replaced without the weighing system having to be newly calibrated.

The invention is achieved according to the invention by the features stated in the main claim. Further advantageous configurations emerge from the subclaims.

DETAILED DESCRIPTION OF THE INVENTION

In the case of the method according to the invention, the parameters stored in the digital load cells during the calibration are read out into the terminal, preferably before the replacement of a digital load cell. In the case of a load-receiving device or a load cell system with usually 4 digital load cells, a maximum of 3 can be replaced at the same time. Since, according to the invention, the parameters of all the cells present in the load cell system are stored in each digital load cell, it is sufficient if one digital load cell is not replaced. After the replacement of the digital load cells, the parameters of the new digital load cells are adjusted with the parameters of the old digital load cells. The result may deviate at most only within quite specific tolerances. Otherwise, the operator receives error messages with tips on eliminating the error. Only when all test steps have been completed with a positive result are the new parameters accepted and the weighing system is again ready for operation and may from then on be considered to be calibrated.

The advantages achieved with the invention are, in particular, the cost and time saving that is brought about by maintaining the validity of the calibration. This means that recalibration is no longer required after the replacement of a load cell.

Furthermore, the overall replacement is simplified. Since the operating sequence in a recalibration is more complex than in the case of the novel method, errors are also more likely to occur during a recalibration.

During a recalibration, calibrating weights have to be successively placed on the load-receiving device in specific loading stages. In the case of load-receiving devices with a large weighing range, this also means very large calibrating weights. These large weights can only be moved with additional auxiliary means, such as for example a crane, lift truck or forklift. The provision of such auxiliary means and the expensive calibrating weights is now superfluous.

In the case of a platform weighing machine for trucks, a recalibration even means that a special calibrating vehicle has to be used. Since such special calibrating vehicles often have to cover a large operating area, they often have to come a very long way and the operating costs are correspondingly high. Furthermore, these calibrating vehicles are generally not immediately available. Their use must even be planned days in advance. Therefore, if a platform weighing machine fails, for example due to a lightning strike, this has until now often meant that no weighing can be carried out for several days.

A container weighing apparatus is a silo, a tank or a mixer which usually stands on 3 feet. A load cell is installed in each of the feet. They together form a load cell system. A calibration of a container weighing apparatus is possible only if a calibrated flow meter is installed in a water supply line. This calibrated flow meter is then used for filling the container with an exact amount of water. After the calibration, the water is often disposed of as waste water. The container may then possibly even also have to be dried before it can be filled again with the actual product. Here, too, the novel method consequently results in considerable simplification.

These and further advantages of the invention are explained in more detail below on the basis of the following description of examples.

To prevent manipulations being carried out on a calibrated weighing apparatus with digital load cells, the authorized service engineer must identify himself by a security mechanism (password, etc.) before the commencement of a replacement of a digital load cell.

In the event of false identification, the replacement function is inhibited and ended.

In the event of correct identification, the authorized service engineer prepares for the replacement of one or more digital load cells. In the case of a load-receiving device or a load cell system with 4 digital load cells, a maximum of 3 digital load cells can be replaced in one operation.

The operator carries out the following steps:
A. establishing which digital load cell(s) is (are) to be replaced
B. identifying the new digital load cell(s) (by serial number).

In the original calibration, that is the adjustment of the weighing system (load-receiving device), data relevant to calibration are stored in each digital load cell as a set of parameters, which are used for testing when a cell is replaced.
I. data of the weighing apparatus of the entire weighing system (weighing apparatus)
II. adjustment data of the entire weighing system
III. corner factors for each corner (individual load cell)
IV. control test value under corner loading with at least 33% of the maximum load of the weighing apparatus
V. internal load cell information (type of cell, classification, etc.)
VI. data of the test curve of the weighing system.

Data of the weighing apparatus are to be understood as meaning:
I. weighing range of the weighing apparatus (for example 600 kg)
II. indicating incrementation (for example 200 g)
III. minimum load (for example 20×indicating incrementation=4 kg)
IV. establishing whether it is a one-scale, two-scale or three-scale weighing apparatus with one, two or three weighing ranges with separately defined indicating incrementation (for example 100 g up to 100 kg and 200 g over 100 kg in the case of a two-scale weighing apparatus)
V. tare range (for example 50% of the weighing range)
VI. zeroing range (for example −1% to +4% of the weighing range).

Adjustment data of a weighing system is understood as meaning the counter readings of the calibration data at the zero limit, under full load and under part load.

In the case of a preferred method according to the invention, in a first step, the set of parameters relevant to calibration of the load cell to be replaced, the data of which are required later for checking the weighing apparatus, are externally buffer-stored. After that, the weighing apparatus is de-energized and the specified and registered digital load cells are replaced.

The data of the set of parameters are preferably read out from a load cell remaining in the system into the control unit. This has the advantage that the method can still be carried out even if the load cell to be replaced is defective in such a way that data can no longer be read out from the load cell.

After the replacement, the weighing apparatus is switched on again. When this happens, the following checks are carried out by the control unit:
I. In order that a load cell not specified at the beginning of the service sequence is not replaced, the address (≡position) of the replaced load cell(s) and the unique internal serial number are checked.
II. The type of load cell and the classification of the new load cell(s) must be compatible with the existing load cell(s). For this purpose, the type and classification data of the new load cell(s) are compared with the buffer-stored data. The new load cell must be the same or better in the classification.
III. If these checks are negative, an error message is output and the function is terminated.
IV. If the result of the previous checks was positive, the externally buffer-stored data are stored back in the load cell(s) used as the new replacement.

Once the data have been loaded, it is checked whether all the digital load cells have approximately equal capacity utilization (in the unloaded state). The deviation of the measured counter values must not exceed ±10% of the sum of all the cell counter values. If the deviation is greater, the operator receives a message that the corners are to be equalized by adjusting the rotating feet.

Testing the Tolerances for Corner Values Without Loading:

| | |
|---|---|
| sum: | $E_{\Sigma Z} = \Sigma(E_{z1}, E_{z2}, E_{z3}, E_{z4})$ |
| mean value: | $\overline{E}_Z = E_{\Sigma Z}/4$ |
| permiss. tolerance (10%): | $\Delta E_Z = E_{\Sigma Z} * 0.10$ |

The parameter Z stands for the load cells Z1, ... Zm permiss. counter values:

$$E_{Zx\ min} = \overline{E}_Z - \Delta E_Z$$

$$E_{Zx\ max} = \overline{E}_Z + \Delta E_Z$$

EXAMPLE $$E_{Z1} = 14307$$

$$E_{Z2} = 14342$$

$$E_{Z3} = 13954$$

$$E_{Z4} = 13833$$

$E_{\Sigma Z}=14307+14342+13954+13833$ $E_{\Sigma Z}=56436$ $\overline{E}_Z=56436/4$ $\overline{E}_Z=14109$ $\Delta E_Z=56436*0.10=5643.6$ $\Delta E_Z=5644$ (value rounded up to the nearest whole number)

Permissible Corner Values:

| | |
|---|---|
| $E_{Zx\ min} = 14109 - 5644$ | $E_{Zx\ max} = 14109 + 5644$ |
| $E_{Zx\ min} = 8465$ | $E_{Zx\ max} = 19753$ |

The 4 digital load cells of this example all lie within the permissible tolerance!

I. Next, the data of the zero point are checked. In this case, the stored counter reading data are compared with the current counter reading data. In the case of a 3000 d weighing apparatus, the measured normalized counter value must not deviate by more than ±20 $d_d$.

In the case of a 6000 d weighing apparatus, the measured normalized counter value must not deviate by more than ±10 $d_d$.

Testing the Tolerances for Zero Values of the Weighing Apparatus (Unloaded State):

| | |
|---|---|
| Stored value: | $N_{Zs}$ |
| measured value: | $N_{Zm}$ |
| permiss. tolerance: | $\Delta N_{Zs} = \pm 20$ or $\pm 10$ |
| permiss. counter values: | $N_{Zm\ min} = N_{Zs} - \Delta N_{Zs}$ |
| | $N_{Zm\ max} = N_{Zs} + \Delta N_{Zs}$ |

EXAMPLE $N_{Zs}=0$ $N_{Zm}=14$

Permissible Zero Values:

| | |
|---|---|
| $N_{Zm\ min} = 0 - 20$ | $N_{Zm\ max} = 0 + 20$ |
| $N_{Zm\ min} = -20$ | $N_{Zm\ max} = 20$ |

The zero value in this example lies within the permissible tolerance!

If the deviation is greater, this is indicated to the operator by means of an error message. As a consequence, the load cell must be replaced again.

II. In the following test step, it is checked whether the weighing apparatus is operating correctly in the loading situation.

For this purpose, an arbitrary known weight, which must correspond at least to 33% of the maximum load of the weighing apparatus, must be positioned on the weighing apparatus (load-receiving device) alternately in each corner region.

Testing the Weighing Apparatus in the Case of Eccentric Loading

Each corner region of the weighing apparatus is tested with about ⅓ of the maximum permissible load in accordance with EN 45501. In this case, an equivalent load may also be used.

In this test, the counter reading for zero and for the test load of all 4 digital load cells is recorded for each corner region. Consequently, the difference in the counter readings for the four corner regions is calculated. From these values, the corner factor of each corner region is calculated by means of a linear system of equations. This factor reflects the loading situation of the corner regions.

Formulae for calculating the corner factors
Calculation of the lifting values $\Delta H_{xy}$ $$\Delta H_{xy}=L_{xy}-N_{xy}$$

x=number of the load cell
y=number of the measurement
L=counter reading for ⅓ load
N=counter reading for zero load
$Ef_y$: corner factor
Calculation of the reference sum values B $$B=(\Sigma(\Delta H_{11}\ldots \Delta H_{41})+\Sigma(\Delta H_{12}\ldots \Delta H_{42})+\Sigma(\Delta H_{13}\ldots \Delta H_{43})+\Sigma(\Delta H_{13}\ldots \Delta H_{44}))/4$$

Linear system of equations:

$$Ef_1*(\Delta H_{11})+Ef_2*(\Delta H_{21})+Ef_3*(\Delta H_{31})+Ef_4*(\Delta H_{41})=B \quad (1)$$

$$Ef_1*(\Delta H_{12})+Ef_2*(\Delta H_{22})+Ef_3*(\Delta H_{32})+Ef_4*(\Delta H_{42})=B \quad (2)$$

$$Ef_1*(\Delta H_{13})+Ef_2*(\Delta H_{23})+Ef_3*(\Delta H_{33})+Ef_4*(\Delta H_{43})=B \quad (3)$$

$$Ef_1*(\Delta H_{14})+Ef_2*(\Delta H_{24})+Ef_3*(\Delta H_{34})+Ef_4*(\Delta H_{44})=B \quad (4)$$

Tolerances of the corner factors of the weighing apparatus:

| | |
|---|---|
| upper limit: | $G_{upper} = 1.01$ |
| lower limit: | $G_{lower} = 0.99$ |
| corner factors: | $Ef_1, Ef_2, Ef_3, Ef_4$ |

The following condition applies for the corner factors:

$$G_{lower} \geq Ef_x \leq G_{upper}$$

x=1 . . . 4
Example of calculated corner factors:

$Ef_1=1.00045673$ $Ef_2=0.99907987$ $Ef_3=1.00126548$ $Ef_4=0.99879485$

Permissible Corner Factor Values:

| | |
|---|---|
| $Ef_{1\ldots 4\ min} = 0.990000$ | $Ef_{1\ldots 4\ max} = 1.0100000$ |

The corner factors calculated from the loading test in this example all lie within the permissible tolerance!

Since all the values lie within the permissible tolerance, the validity of the calibration of the weighing apparatus is maintained unchanged.

If the deviation of only one corner factor is greater than the permissible tolerance, an error message is output and the function is terminated. The service function must be restarted or the weighing apparatus can no longer be used for commercial operations that are subject to calibration.

The service function can be repeated any number of times, since the original data remain unchanged when errors occur.

If a positive result still cannot be obtained after numerous repetitions, the weighing apparatus must be newly calibrated.

III. As a final test step, the weight positioned on the weighing apparatus is compared with the data of the stored test curve. The test curve is created during the original calibration, weights covering a large part of the weighing range being placed on the load-receiving device in a number of steps, and the associated counter readings determined.

IV. If all the test steps have been completed with a positive result, a uniquely assigned characteristic identification number (characteristic ID) is entered in each replaced digital load cell.

V. The service intervention is documented in the service logbook. For this purpose, the date, time of day, type of service function and additional information on each service intervention are recorded.

The service logbook is stored in each digital load cell and in the protected memory area of the respective device.

Backup of the Weighing Apparatus Parameters

The parameters of the weighing apparatus are stored in the respective EEPROM of the analog digital converter fitted in the digital load cell.

Access to the parameters of the weighing apparatus is only possible by a backup infringement (hardware or software backup) in the evaluation device, or via the software module.

In the case of access via the software module, the stored data cannot be changed by the operator. After successful completion of all the tests, the necessary data are automatically changed in the background by the software.

It is not possible for the operator to change parameters of the weighing apparatus.

Completing the Service Procedure

Various possibilities for completing the service procedure are offered.

I. end procedure with return to the weighing mode
II. end procedure with printout of the new cell data and subsequent return to the weighing mode
III. end procedure with output of the new cell data to an interface and subsequent return to the weighing mode.

The invention claimed is:

1. Method for replacing load cells in a calibrated weighing system having a number of digital load cells, the load cells being connected to a control unit via a bus system, the digital load cells providing weight values in the form of counter values and each load cell having a set of load cell parameters relevant to calibration for each load cell of the weighing system, stored in a parameter memory, wherein the event of a replacement, at least one of the previous load cells remains in the weighing system and in that, once the replacement has taken place, a new set of parameters is determined for the load cell used as the replacement via the central control unit on the basis of the data of the replaced load cell, which the control unit receives from the load cell remaining in the system, and is stored in the parameter memories of all the load cells.

2. Method according to claim 1, wherein the set of load cell parameters relevant to calibration comprises at least data of the weighing apparatus, adjustment data, corner factors, a control test value, load cell characterization and service access data.

3. Method according to claim 2, wherein the set of load cell parameters relevant to calibration additionally comprises data of the test curve of the load cell system and/or an analog-digital converter identification code for the system assignment.

4. Method according to claim 1, wherein the load cell used as a replacement is tested on the basis of its internal serial number for the permissibility of the calibrated weighing system.

5. Method according to claim 1, wherein the load cell used as a replacement is tested for its counter value in the unloaded state of the weighing system, adjustment of the load distribution over the entirety of the load cells being initiated if the counter value deviates from the mean value of all the counter values of the load cells of the weighing system by no more than $\pm 10\%$ of the sum of all the load cell counter values.

6. Method according to claim 5, wherein in a step which then follows, the load cell used as a replacement is tested in a zero value measurement for maintaining a predetermined tolerance in the unloaded state of the weighing system.

7. Method according to claim 6, wherein in a step following the zero value measurement, the load cell used as a replacement is tested for maintaining a predetermined tolerance in a first loading state.

8. Method according to claim 7, wherein in the loading state test, a load of at least 33% of the maximum load of the weighing system is used.

9. Method according to claim 8, wherein a test curve of the load cell system is stored in the load cells and in that, in the loading state testing, the value obtained for the load cell used as a replacement is compared with the test curve of the replaced load cell and it is checked whether they coincide within predetermined tolerance limits.

10. Method according to claim 1, wherein the set of load cell parameters of a load cell to be replaced is read out from a load cell remaining in the system into the control unit before the replacement.

* * * * *